Patented Feb. 8, 1949

2,461,142

UNITED STATES PATENT OFFICE 2,461,142

PRODUCTION OF BETA-TRICHLOR-ETHANE

Oliver W. Cass, Niagara Falls, N. Y., assignor to E. I. du Pont de Nemours & Company, Wilmington, Del., a corporation of Delaware No Drawing. Application August 26, 1944, Serial No. 551,452

2 Claims. (Cl. 204—163)

This invention relates to the production of beta-trichlorethane, otherwise known as 1,1,2-trichlorethane. More particularly, this invention relates to the production of beta-trichlorethane by reacting chlorine and hydrogen chloride with acetylene.

It has previously been proposed to prepare beta-trichlorethane from ethylene by the addition of chlorine to ethylene to form ethylene dichloride followed by the chlorination of ethylene dichloride with the formation of beta-trichlorethane and hydrogen chloride, in accordance with the following equation:

$$CH_2=CH_2+Cl_2 \rightarrow CH_2ClCH_2Cl$$

$$CH_2ClCH_2Cl+Cl_2 \rightarrow CHCl_2CH_2Cl+HCl$$

It has further been stated that it is possible to carry out the above two reactions simultaneously in the presence of catalytic materials with the net result that ethylene is chlorinated to beta-trichlorethane and hydrogen chloride:

$$CH_2=CH_2+2Cl_2 \rightarrow CHCl_2CH_2Cl+HCl$$

As may be seen from the above equations, the preparation of 1 mole of beta-trichlorethane by either of these suggested routes involves the usage of two moles of chlorine and the elimination of one mole of by-product hydrogen chloride, which under ordinary conditions must be neutralized or otherwise disposed of. These processes are thus wasteful of chlorine.

It has also been proposed to prepare beta-trichlorethane from acetylene by the formation of vinyl chloride by the addition of hydrogen chloride to acetylene followed by the chlorination of this vinyl chloride to beta-trichlorethane. Equations for these reactions follow:

$$CH \equiv CH+HCl \rightarrow CH_2=CHCl$$

$$CH_2=CHCl+Cl_2 \rightarrow CH_2ClCHCl_2$$

This process involves the usage of only one mole of chlorine plus one mole of hydrogen chloride for the formation of each mole of beta-trichlorethane, but it suffers from the disadvantage of requiring two separate units in which to carry out the process. The first of these units, that is, the unit for the formation of vinyl chloride, is relatively expensive in installation costs.

It has also been proposed to combine the two steps of the above process. For example, British Patent 344,592, relates to the direct addition of a gaseous mixture of hydrogen chloride and chlorine to gaseous acetylene either in the presence of contact agents or at sufficiently high temperatures, usually in the neighborhood of 200–250° C. to cause reaction between the gases. To avoid the explosion hazard which is necessarily present when gaseous mixtures containing acetylene and chlorine are handled, it is further proposed in this same patent to have present a large excess of either hydrogen chloride or acetylene or to have present a large excess of an inert diluting gas.

The operation of the process disclosed in the above British patent suffers from severe technical limitations. The possibility of explosion is always present and if the amount of chlorine is kept small in order to avoid explosion, the apparatus becomes unwieldy if a large production is desired. Furthermore, the question of catalyst life in case a catalyst is used, or the question of construction material in case no catalyst but higher temperature is used proves troublesome. As a result, the process as outlined in the above British patent is of very doubtful commercial value.

It is an object of this invention to produce beta-trichlorethane by reacting chlorine and hydrogen chloride with acetylene in such a manner as to eliminate any hazard of explosion.

It is another object of this invention to produce beta-trichlorethane by reacting chlorine and hydrogen chloride with acetylene, the three being present in substantially equimolecular proportions, without danger from explosion.

It is still another object of this invention to produce beta-trichlorethane by reacting chlorine and hydrogen chloride with acetylene, the three being present in substantially equimolecular proportions, in the presence of actinic light and in the absence of a catalyst.

Other objects of the invention will be apparent from the following description.

The objects of this invention may be accomplished by passing chlorine, hydrogen chloride and acetylene into a non-reactive liquid chlorohydrocarbon in the presence of actinic light, preferably at a temperature of between −30° C. and 25° C. The non-reactive liquid chlorohydrocarbon may advantageously consist of the products of the reaction, comprising mainly beta-trichlorethane and symmetrical tetrachlorethane. It is greatly to be preferred that the reaction between the chlorine, hydrogen chloride and acetylene be carried out under oxygen-free conditions, since the presence of even small quantities of oxygen or air will cause a marked decrease in the reaction rate.

In carrying out the reaction the chlorine, hydrogen chloride and acetylene are preferably passed into the liquid chlorohydrocarbon in substantially equimolecular quantities, and with the liquid chlorohydrocarbon maintained, by cooling, at the desired temperature of between −30° C. and 25° C. The actinic light may be supplied by means of an ordinary tungsten filament electric light bulb of the desired wattage, or by so-called "fluorescent" bulbs, or by sources rich in ultraviolet radiation. The unreacted gases may be withdrawn from the top of the reaction vessel and again passed into the liquid chlorohydrocarbon to increase the yield.

The following detailed examples are given to illustrate the process of the present invention, it being understood that the invention is not to be limited by the details set forth in these examples.

Example I

A glass-lined reaction vessel, which was fitted with a jacket and cooling coils through which brine could be circulated, was equipped with a stirrer, inlet tubes for acetylene, chlorine and hydrogen chloride, a thermometer well and an offgas line leading from the top of the reactor to a scrubbing system, which also served as a gas analysis system to determine the amount and composition of the gases escaping from the top of the reactor. At the top of the reactor, an overflow was provided so that as the liquid product was made in the reactor, it could continuously overflow through a liquid seal into a receiver. The reactor was also equipped with a light well into which was lowered an ordinary 60 watt tungsten filament incandescent lamp bulb. The reactor was filled completely to the level of the overflow line with beta-trichlorethane. The stirrer was started, the light was turned on and acetylene, chlorine, and hydrogen chloride were admitted to the reaction in equimolar quantities. The temperature of the reactor and contents was maintained at −20° C. by rapid circulation of cold brine through the jacket and coils. The gases were admitted to the reactor at such a rate that the receiver collected a volume of liquid equivalent to the total volume of the reactor each 24 hours. When operating under these conditions, for each 300 moles of gas fed (namely, 100 each of chlorine, hydrogen chloride, and acetylene) there was produced approximately 70 moles beta-trichlorethane, together with 15 moles tetrachlorethane. Trace amounts of other chlorinated hydrocarbons were present. The offgas which escaped from the reactor under the above conditions consisted roughly of 15 moles acetylene, and 30 moles hydrogen chloride. This offgas could advantageously be recirculated, with appropriate adjustment of the feed ratios under which conditions essentially no unabsorbed offgases were produced and complete conversion of the hydrogen chloride, acetylene, and chlorine to beta-trichlorethane and tetrachlorethane was secured.

The product from the above reaction, consisting almost altogether of beta-trichlorethane and symmetrical tetrachlorethane, can be continuously passed from the receiver into a fractionating column whereby to separate said two constituents. There may be thus secured beta-trichlorethane from the top of the fractionating column in essentially pure condition, while from the bottom of the fractionating column, tetrachlorethane may be secured, likewise in essentially pure condition. For removal of the small amount of dissolved hydrogen chloride present in the beta-trichlorethane, filtration through soda ash or other basic media is sufficient.

In no case during operation of this equipment has any tendency toward explosion or carbonization been encountered. The reaction product has remained uniformly water white.

Example II

In exactly the same fashion as in Example I above, acetylene, chlorine, and hydrogen chloride were led into the reactor, this time maintained at 0° C. The net result of operating at this higher temperature was to reduce the amount of beta-trichlorethane formed and to increase the amount of tetrachlorethane formed, until the product contained roughly 65% of the former material and 35% of the latter.

Example III

The reactor was operated as in Example I above with the exception that the temperature was allowed to rise to 35° C. Under these conditions, the amount of beta-trichlorethane formed dropped very sharply, until, at 35° C. the product contained only 15% beta-trichlorethane, together with 85% tetrachlorethane. I, therefore, consider that the upper practical operating temperature for my invention is in the neighborhood of 25° C.

Beta-trichlorethane is a valuable chlorohydrocarbon which is manufactured commercially on a large scale and which is used as a non-inflammable solvent and as a raw material in the preparation of other chlorinated hydrocarbons, especially in the preparation of the unsaturated chlorohydrocarbon, vinylidene chloride ($CH_2=CCl_2$).

As will be apparent from the above discussion, the product which I secure from my reaction is not contaminated with catalytic material of any kind and consists of beta-trichlorethane together with appreciable quantities of symmetrical tetrachlorethane. As these two compounds boil 32° apart, it is easy to secure pure beta-trichlorethane by a simple fractionation operation. The residual symmetrical tetrachlorethane is of value commercially both as a solvent and as an intermediate in the manufacture of trichlorethylene so that the revenue secured by this material is sufficient to cover the cost of its separation from the beta-trichlorethane as well as the cost of the raw material going into its production.

Since it is obvious that many changes and modifications can be made in the above-described details without departing from the nature and spirit of the invention, it is to be understood that the invention is not to be limited to the specific details above-described except as set forth in the appended claims.

I claim:

1. A process for producing beta-trichlorethane which comprises passing chlorine, hydrogen chloride and acetylene in substantially equimolecular proportions into a liquid chlorohydrocarbon containing a predominant amount of beta-trichlorethane, at a temperature between −30° C. and 25° C., in the presence of actinic light.

2. A process for producing beta-trichlorethane which comprises passing chlorine, hydrogen chloride and acetylene in substantially equimolecular proportions into a liquid chlorohydrocarbon containing a predominant amount of beta-trichlorethane, at a temperature between −30° C., and 25° C., in the presence of actinic light, withdrawing unreacted gases and recirculating said withdrawn gases through said liquid chlorohydrocarbon.

OLIVER W. CASS.

REFERENCES CITED

The following references are of record in the file of this patent:

UNITED STATES PATENTS

| Number | Name | Date |
|---|---|---|
| 1,414,852 | Bauer | May 2, 1922 |
| 1,833,393 | Ernst et al. | Nov. 24, 1931 |
| 1,914,465 | Soll et al. | June 20, 1933 |
| 2,140,551 | Reilly | Dec. 20, 1938 |
| 2,174,737 | Coleman et al. | Oct. 3, 1939 |
| 2,312,064 | Baehr et al. | Feb. 23, 1943 |

OTHER REFERENCES

Hass et al.; Industrial and Engineering Chemistry, vol. 27 (1935), page 1193.